United States Patent [19]

Wright

[11] Patent Number: 4,722,464

[45] Date of Patent: Feb. 2, 1988

[54] CASSETTE EQUIPMENT CARRIER

[76] Inventor: Christopher Wright, 203 Lake Forest, Bonner Springs, Kans. 66012

[21] Appl. No.: 822,152

[22] Filed: Jan. 24, 1986

[51] Int. Cl.$^4$ ............................................. A45F 3/00
[52] U.S. Cl. .................................... 224/224; 224/203; 224/235; 224/251
[58] Field of Search ............... 224/224, 902, 203, 227, 224/251, 239, 240, 202, 242, 245, 258, 257, 205; 206/459

[56] References Cited

U.S. PATENT DOCUMENTS

| | | | |
|---|---|---|---|
| D. 134,542 | 12/1942 | Wax | 224/224 X |
| D. 259,151 | 5/1981 | Kishbaugh et al. | 224/224 X |
| 798,754 | 9/1905 | Taylor | 224/202 |
| 984,768 | 2/1911 | LeClaire | 224/224 X |
| 1,110,694 | 9/1914 | Jennings | 224/203 |
| 1,373,739 | 4/1921 | Jennings | 224/224 |
| 3,919,615 | 11/1975 | Niecke | 224/227 X |
| 3,931,917 | 1/1976 | Zellmer | 224/203 |
| 4,108,341 | 8/1978 | Pettinger | 224/224 |
| 4,412,106 | 10/1983 | Pauel | 455/89 X |
| 4,479,596 | 10/1984 | Swanson | 224/240 X |
| 4,569,465 | 2/1986 | O'Farrell | 224/224 |
| 4,579,265 | 4/1986 | Schiller | 224/224 X |
| 4,613,068 | 9/1986 | Bianchi | 224/203 X |
| 4,620,653 | 11/1986 | Farrell | 224/242 |

Primary Examiner—Henry J. Recla
Attorney, Agent, or Firm—H. Jay Spiegel

[57] ABSTRACT

Disclosed herein are embodiments of a cassette equipment carrier. In a first embodiment thereof, the invention includes a belt having a plurality of pockets thereon for storage of cassette tapes, a plurality of loop-like retaining devices to retain batteries and a pocket sized to receive therein a portable cassette-tape player device. In this embodiment, the belt is designed to be worn about the waist of the user. In a further embodiment, a cassette equipment carrier is disclosed which includes pockets for cassette tapes, retainers for batteries and a pocket for a portable cassette-tape player, but in this embodiment, the belt is designed and the retainers and pockets are so oriented that the belt may be worn over one shoulder of the user.

10 Claims, 2 Drawing Figures

CASSETTE EQUIPMENT CARRIER

BACKGROUND OF THE INVENTION

In the prior art, it is known to provide article retaining means in the form of a belt including a plurality of containers of some type or another for retention of various objects therein. The following prior art is known to Applicant:

U.S. Pat. No. Des. 261,196 to Griffin discloses a sportsman's belt which includes a plurality of zippered receptacles therein for retention of various articles.

U.S. Pat. No. 4,440,525 to Perla discloses a diver's weight belt which includes a plurality of receptacles provided to receive individual weights which receptacles are fastened in a closed position by virtue of hook and pile fastening means while the belt is fastened about the waist of the user thereof through the further provision of additional hook and pile fastening means.

Neither of these prior art references is believed to anticipate or render obvious the teachings of the present invention since none of them contemplates the problems contemplated by Applicant nor does either of them solve these problems in a meaningful way.

In the prior art, there has been a great need for a device which may carry all the equipment which is necessary in order for one to listen to music or other program material while one is away from all sources of electrical power.

While portable tape players and radios are well known in the art, to this time, no one has devised a device which will enable one to listen to cassette-tapes played by a portable tape player while also enabling one to store several additional tapes for later playing and while at the same time providing a further means to store replacement batteries should the tape player or radio have batteries which become dead as is inevitable.

It was in light of these problems, that the present invention was developed.

SUMMARY OF THE INVENTION

The present invention overcomes the deficiencies in the prior art and provides a new cassette equipment carrier device which allows the user thereof to utilize a portable tape-player or radio for long periods of time away from a source of electrical power.

The present invention includes the following interrelated aspects and elements:

(a) In a first embodiment of the present invention, the device includes an elongated belt having fastening means for fastening the belt about the waist of the user.

(b) This first embodiment further includes a plurality of receptacles each of which may receive a single cassette-tape and each of which may, if desired, have a flap which may be fastenable to safely retain each respective tape in its respective receptacle.

(c) The first embodiment further includes a reinforced area designed to removably receive a mounting means such as a clip attached to a portable tape-player or radio. Alternatively, this area may include, if desired, a further receptacle sized to receive therein the tape player or radio.

(d) In this embodiment, the belt may further include a plurality of retaining means each of which is sized and designed to removably retain therein a replacement battery for the tape player or radio. Thus, with the plurality of such retaining means affixed to the belt, if the batteries in the tape player or radio become totally discharged, they may be easily replaced without the necessity of going to a store to purchase new batteries on the spot.

(e) In a final aspect of the first embodiment, the receptacles and retaining means are all oriented on the belt so that the tape player or radio, cassette-tapes and batteries are all oriented vertically. In this way, there is no danger that any of them will be dislodged or removed from the belt and the user has easy access thereto.

(f) In a second embodiment of the present invention, all of the components as set forth hereinabove concerning the first embodiment are also included therein. The difference is that the belt is designed to be worn over the shoulder and accordingly, in view of the fact that the belt rests at an angular relationship with respect to the horizontal, the receptacles and retaining means may be mounted on the belt at an oblique angle to its direction of elongation so that with the belt placed over one shoulder of the user, the receptacles and retaining means are oriented so that the force of gravity assists in retaining the tape player or radio and cassette-tapes in their respective receptacles.

(g) In both embodiments, the retaining means for the batteries are formed of an elastic fabric of a relaxed circumference smaller than the battery circumference so that their natural elasticity is the means for retaining the respective batteries therein.

Accordingly, it is a first object of the present invention to provide an improved cassette equipment carrier.

It is a further object of the present invention to provide such a cassette equipment carrier which enables one to easily carry a cassette tape player or radio and a plurality of replacement tapes and replacement batteries all at once.

It is a still further object of the present invention to provide such a device in embodiments enabling the device to be worn either about the waist or over the shoulder.

It is a still further object of the present invention to provide such a device with fastening means for the receptacles thereof so as to aid in retaining the cassette tape player or radio and cassette tapes in their respective receptacles.

These and other objects, aspects and features of the present invention will be better understood with reference to the following detailed description of the preferred embodiments when read in conjunction with the appended drawing figures.

SPECIFIC DESCRIPTION OF THE PREFERRED EMBODIMENT

Figure 1:
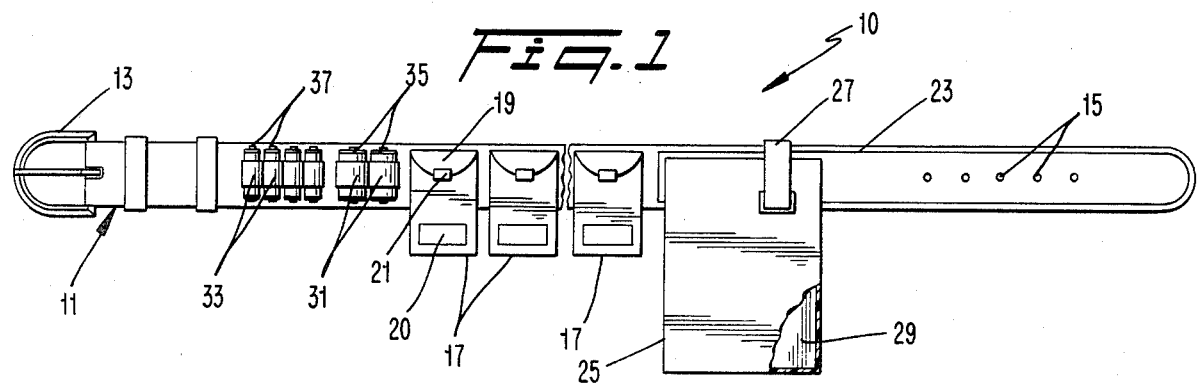
FIG. 1 shows a front view of a first embodiment of the present invention.

With reference now to FIG. 1, a first embodiment of the present invention is designated by the reference numeral 10 and is seen to include a belt 11 which may, if desired, be made of any flexible material such as for example leather or nylon. The belt includes fastening means including a buckle 13 and a plurality of holes 15 at the other end thereof for fastening with the buckle 13 as is well known in the art.

As further shown in FIG. 1, the device 10 includes a plurality of receptacles 17 each of which includes a pivotable closure 19 such as a flap and fastening means 21 for the closure which may, if desired, comprise a snap fastener or hook and pile fastening means, commonly known by the Trademark Velco ™.

As further shown in FIG. 1, the device 10 further includes a reinforced area 23 having mounted thereon a further receptable 25 which may, if desired, be mounted on the belt 11 by virtue of a loop device 27 which may be fitted over the end of the belt 11. The receptacle 25 is sized to securely receive therein a portable tape-player or radio designated by the reference numeral 29. Due to the weight of the tape player or radio 29, the reinforcing means 23 is provided to help to facilitate the carrying thereof by the belt 11. Alternatively, the reinforcing means 23 may serve a different purpose. In particular, it may be desirable to directly attach the radio or tape player 29 to the belt without the provision of a receptacle 25. In such a case, the radio or tape player 29 may be provided with a clip (not shown) which may merely be clipped over the reinforcing means 23. If desired, the receptacle 25 may be retained and instead of a loop 27, a clip may be utilized which may be attached to the receptacle 25 and then clipped over the belt 11 in the area of the reinforcing means 23.

As further shown in FIG. 1, the belt 11 has attached thereto a plurality of first retaining means 31 and second retaining means 33. Each of the retaining means 31 and 33 consists of a loop of elastic fabric securely fastened to the belt 11 and sized to have a circumference slightly smaller than the circumference of the battery which it is intended to retain. Thus, as seen in FIG. 1, the retaining means 31 is sized to snugly retain batteries 35 while the smaller retaining means 33 are sized to securely retain the smaller batteries 37. The different sized battery retaining means 31 and 33 are provided since different tape players and radios may be powered by different sized batteries and thus the device 10 is thereby made more versatile.

In a further aspect of the device 10 shown in FIG. 1, each of the receptacles 17 may include a writing area 20 specifically provided so that the user thereof may write in the area 20 identifying matter concerning the tape which is stored in the respective receptacle 17.

Figure 2:
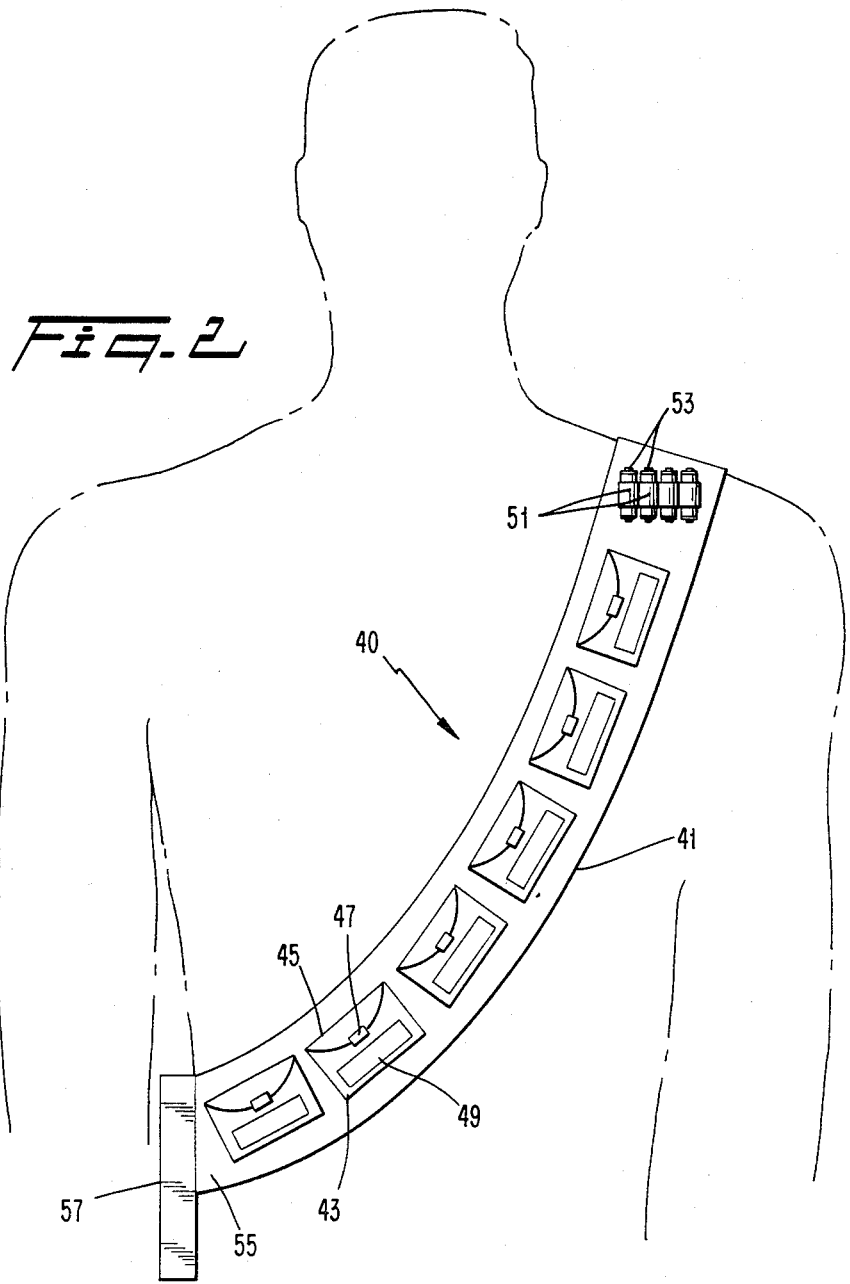
FIG. 2 shows a front view of a second embodiment of the present invention.

With reference now to FIG. 2, a second embodiment of the present invention is shown and designated by the reference numeral 40. The device 40 includes a belt 41 having fastening means (not shown) similar in design to the fastening means 13,15 of the device 10 of FIG. 1. Further, the device 40 includes a plurality of receptacles 43 each of which includes a closure means 45 consisting of, for example, a flap which may be fastened in a closed position by fastening means 47 which may, if desired, again, consist of snap fasteners, hook and pile fastening devices or the like. Further, each receptacle 43 includes a writing area 49 where identifying information may be written identifying the tape which is stored in the respective receptacle 43. As shown, the receptacles 43 are aligned with the longitudinal extent of the belt 41, however, if desired, or where the flaps 45 are not included, each of the receptacles 43 may be mounted on the belt at an oblique angle to the direction of elongation thereof so that each receptacle 43 has an opening at the top thereof which is substantially parallel to the ground surface when worn as shown in FIG. 2, rather than the angular relationship as shown in FIG. 2. Either manner of attachment of the receptacles to the belt 41 are believed to be within the purview of the present invention.

As further shown in FIG. 2, the belt 41 has mounted thereon retaining means 51 consisting of a plurality of pieces of elastic fabric which are sized so as to have a circumferential extent slightly less than the circumferential extent of the batteries 53 which may be releasably fixed therein. As shown in FIG. 2, the retaining means 51 are angularly related to the direction of elongation of the belt 41 so that the batteries 53 assume a vertical position with respect to the ground when the belt 41 is worn as shown in FIG. 2. However, in view of the retention power of the retaining means 51, if desired, the retaining means 51 may be mounted on the belt 41 in a manner related to the direction of elongation thereof corresponding to that which is shown in FIG. 1.

As further shown in FIG. 2, the belt 41 includes a reinforced area 55 on which may be mounted a tape player or radio designated in the figure by the reference numeral 57. Of course, as disclosed in FIG. 1, if desired, a further receptacle (not shown) may be mounted at the reinforced area 55 and may be provided with an opening enabling the device 57 to be inserted therein and removed therefrom.

In each of the embodiments disclosed hereinabove, the tape receiving receptacles may be attached to the belt by any suitable means such as adhesive, riveting, stapling or any other known fastening means which may securely fasten the receptacles to the belt while avoiding structural damage thereto or sharp points which could injure the user.

Thus, an invention has been disclosed hereinabove in two embodiments which is believed to achieve each and every one of the objects as set forth hereinabove. Of course, various modification, alterations and changes in the teachings of the present invention may be contemplated by those skilled in the art without departing from the spirit and scope of the present invention. Accordingly, it is intended that the present invention only be limited by the terms of the appended claims.

I claim:

1. A cassette equipment carrier comprising:
  (a) an elongated belt having opposed ends with means which can be selectively fastened together to secure the belt on a user thereof;
  (b) first retaining means including a plurality of receptacles fastened to said belt, each receptacle being sized to receive therein a tape cassette and including a writing area thereon for writing information identifying a tape cassette contained therein;
  (c) a plurality of elastic retaining means mounted on said belt, each retaining means being provided for retaining therein a battery; and
  (d) means including a reinforced region on said belt for attaching to said belt a battery operated program playing device said elastic retaining means being adapted to retain batteries which are compatible with said program playing device.

2. The invention of claim 1, wherein further comprising said program playing device includes an integral clip which may be clipped over said reinforced region.

3. The invention of claim 1, further comprising a further receptacle sized to removably receive therein said program playing device, and means for attaching said further receptacle to said reinforced region.

4. The invention of claim 1, wherein each said receptacle includes an opening and a flap releasably overlying said opening and attachable to said receptacle by fastening means.

5. The invention of claim 1, wherein said belt is designed to be worn about the waist of a user.

6. The invention of claim 1, wherein said belt is designed to be worn over the shoulder of a user thereof.

7. The invention of claim 6, wherein said retaining means are mounted on said belt at an oblique angle with respect to the direction of elongation of the belt.

8. The invention of claim 6, wherein said program playing device is mounted on said belt at an area thereon wherein said program playing device is vertically oriented with respect to a ground surface when a user thereof is standing with the belt mounted over said shoulder.

9. The invention of claim 1, wherein said program playing device comprises a tape player.

10. The invention of claim 1, wherein said program playing device comprises a radio.

* * * * *